United States Patent
Tan et al.

(10) Patent No.: US 9,772,673 B2
(45) Date of Patent: *Sep. 26, 2017

(54) ELECTRONIC DEVICE WITH POWER MANAGEMENT MECHANISM AND POWER MANAGEMENT METHOD THEREOF

(71) Applicant: HTC Corporation, Taoyuan (TW)

(72) Inventors: Tzu-Chia Tan, Taoyuan (TW);
Chu-Yang Hsu, Taoyuan (TW);
Che-Chuan Hu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 59 days.

This patent is subject to a terminal disclaimer.

(21) Appl. No.: 14/735,151

(22) Filed: Jun. 10, 2015

(65) Prior Publication Data

US 2015/0346796 A1 Dec. 3, 2015

Related U.S. Application Data

(63) Continuation of application No. 13/610,895, filed on Sep. 12, 2012, now Pat. No. 9,075,611.

(51) Int. Cl.
*G06F 1/32* (2006.01)
*G06F 9/50* (2006.01)
*G06F 1/20* (2006.01)

(52) U.S. Cl.
CPC .............. *G06F 1/324* (2013.01); *G06F 1/206* (2013.01); *G06F 1/3243* (2013.01);
(Continued)

(58) Field of Classification Search
CPC ..... G06F 9/5094; G06F 1/327; G06F 1/32873
See application file for complete search history.

(56) References Cited

U.S. PATENT DOCUMENTS

2006/0279152 A1* 12/2006 Ha .................. G06F 1/3203
310/114
2009/0150898 A1 6/2009 Sohn et al.
(Continued)

FOREIGN PATENT DOCUMENTS

CN 1345425 4/2002
CN 100461071 2/2009

OTHER PUBLICATIONS

"Office Action of China Counterpart Application", issued on Sep. 1, 2015, p. 1-p. 10.

*Primary Examiner* — Kim Huynh
*Assistant Examiner* — Brandon Kinsey
(74) *Attorney, Agent, or Firm* — Jianq Chyun IP Office

(57) ABSTRACT

An electronic device with a power management mechanism and a power management method thereof are disclosed. The electronic device includes a multi-core processor and a temperature sensor. The multi-core processor has a plurality of processor cores. The temperature sensor is coupled to the multi-core processor. The temperature sensor detects the temperature of the multi-core processor and determines whether the electronic device enters an underclocking mode from a performance priority mode according to the detected temperature. When the temperature of the multi-core processor is greater than a first temperature threshold, the multi-core processor controls the electronic device to enter a first underclocking mode and dynamically adjusts an enabled core number. When the temperature of the multi-core processor is greater than a second temperature threshold, the multi-core processor controls the electronic device to enter a second underclocking mode. The first temperature threshold is smaller than the second temperature threshold.

10 Claims, 6 Drawing Sheets

(52) U.S. Cl.
CPC .......... *G06F 1/3287* (2013.01); *G06F 9/5094* (2013.01); *Y02B 60/1239* (2013.01); *Y02B 60/1275* (2013.01)

(56) References Cited

U.S. PATENT DOCUMENTS

| | | | |
|---|---|---|---|
| 2012/0110352 A1* | 5/2012 | Branover | G06F 1/206 713/300 |
| 2012/0179441 A1* | 7/2012 | Anderson | G06F 1/206 703/6 |

* cited by examiner

ELECTRONIC DEVICE WITH POWER MANAGEMENT MECHANISM AND POWER MANAGEMENT METHOD THEREOF

CROSS REFERENCE TO RELATED APPLICATION

This application is a continuation application of and claims the priority benefit of a prior application Ser. No. 13/610,895, filed on Sep. 12, 2012, now allowed. The entirety of the above-mentioned patent application is hereby incorporated by reference herein and made a part of this specification.

BACKGROUND OF THE INVENTION

1. Field of the Invention

The invention generally relates to an electronic device and a power management method thereof, and more particularly, to an electronic device with a multi-core processor and a power management method thereof.

2. Description of Related Art

In recent years, various portable electronic devices, such as smart phones and tablet computers, have been widely spread and become one of the most indispensable parts of our daily life. Such an electronic device provides diversified functions. Accordingly, along with the explosive growth in the amount of data to be processed, a conventional electronic device with a single-core processor cannot provide a satisfactory execution performance.

In order to improve the execution performance and operational capability, electronic devices with multi-core processors are developed. The average power consumption and the temperature curve of a multi-core processor are very different from those of a single-core processor. Thereby, how to control the temperature and reduce the power consumption while, at the same time, improving the execution performance and operational capability of the processor is the key to competitiveness improvement of electronic products.

FIG. 1 is a diagram illustrating the enabled core number of a conventional electronic device with a multi-core processor. Referring to FIG. 1, originally, four processor cores of the conventional electronic device are running, and the number of running processor cores is adjusted at intervals of 500 ms. Because the temperature T of the multi-core processor is greater than the tolerable temperature $T_{tole}$ of the electronic device (i.e., $T>T_{tole}$) at 500 ms, the electronic device adjusts the number of running processor cores to 2 so as to reduce the element temperature or surface temperature of the multi-core processor. However, if a user is playing a highly dynamic electronic game by using the electronic device, the sudden drop in the number of running processor cores will surely affect the system performance and cause the presentation of the electronic game to lose its smoothness. Accordingly, discomfort will be experienced by the user.

SUMMARY OF THE INVENTION

Accordingly, the invention is directed to an electronic device with a power management mechanism and a power management method thereof, in which the power consumption of the electronic device is reduced and the temperature increase thereof is slowed down at the same time when the system performance is maintained to provide a comfortable visual experience to the user.

The invention provides an electronic device with a power management mechanism. The electronic device includes a multi-core processor and a temperature sensor. The multi-core processor has a plurality of processor cores. The temperature sensor is coupled to the multi-core processor. The temperature sensor detects the temperature of the multi-core processor and determines whether the electronic device enters an underclocking mode from a performance priority mode according to the temperature of the multi-core processor. When the temperature of the multi-core processor is greater than a first temperature threshold, the multi-core processor activates a first underclocking mode to dynamically adjust an enabled core number. Herein the enabled core number is the number of enabled processor cores among the processor cores. When the temperate of the multi-core processor is greater than a second temperature threshold, the multi-core processor controls the electronic device to enter a second underclocking mode, so as to fixate the enabled core number. The first temperature threshold is smaller than the second temperature threshold.

According to an embodiment of the invention, the electronic device with the power management mechanism further includes a power control unit coupled to the multi-core processor. The power control unit sets a switching frequency. The multi-core processor periodically switches the enabled core number so that the enabled core number between a first setting value and a second setting value according to the switching frequency. The second setting value is smaller than the first setting value.

According to an embodiment of the invention, the power control unit determines whether a current frame rate variation is smaller than a predetermined frame rate variation. If the current frame rate variation is smaller than the predetermined frame rate variation, the power control unit updates the switching frequency. Besides, the multi-core processor periodically switches the enabled core number according to the updated switching frequency.

According to an embodiment of the invention, the power control unit reduces the switching frequency, and the multi-core processor controls the enabled core number to remain at the second setting value for a prolonged time period while at the first setting value for an unchanged time period according to the switching frequency.

According to an embodiment of the invention, after the electronic device enters the second underclocking mode, the multi-core processor fixates the enabled core number to a third setting value. The third setting value is smaller than the first setting value.

According to an embodiment of the invention, the electronic device is a smart phone, a notebook computer, an ultrabook computer, or a tablet computer.

According to an embodiment of the invention, the temperature sensor is one or a combination of a thermistor, a thermalcouple, and a thermaldiode.

The invention provides a power management method adapted to an electronic device with a multi-core processor. The power management method includes following steps. The temperature of the multi-core processor is detected, and whether the electronic device enters an underclocking mode from a performance priority mode is determined according to the temperature of the multi-core processor. When the temperature of the multi-core processor is greater than a first temperature threshold, a first underclocking mode is activated to dynamically adjust an enabled core number of the multi-core processor. Herein the enabled core number is the number of a plurality of enabled processor cores in the multi-core processor. When the temperature of the multi-core processor is greater than a second temperature threshold, a second underclocking mode is activated to fixate the enabled core number. The first temperature threshold is smaller than the second temperature threshold.

As described above, the invention provides an electronic device and a power management method thereof, in which the number of running processor cores is dynamically adjusted to reduce the power consumption of the electronic device and slow down the temperature increase thereof while, at the same time, maintaining the system performance to provide a comfortable visual experience to the user when the electronic device is in the underclocking mode.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
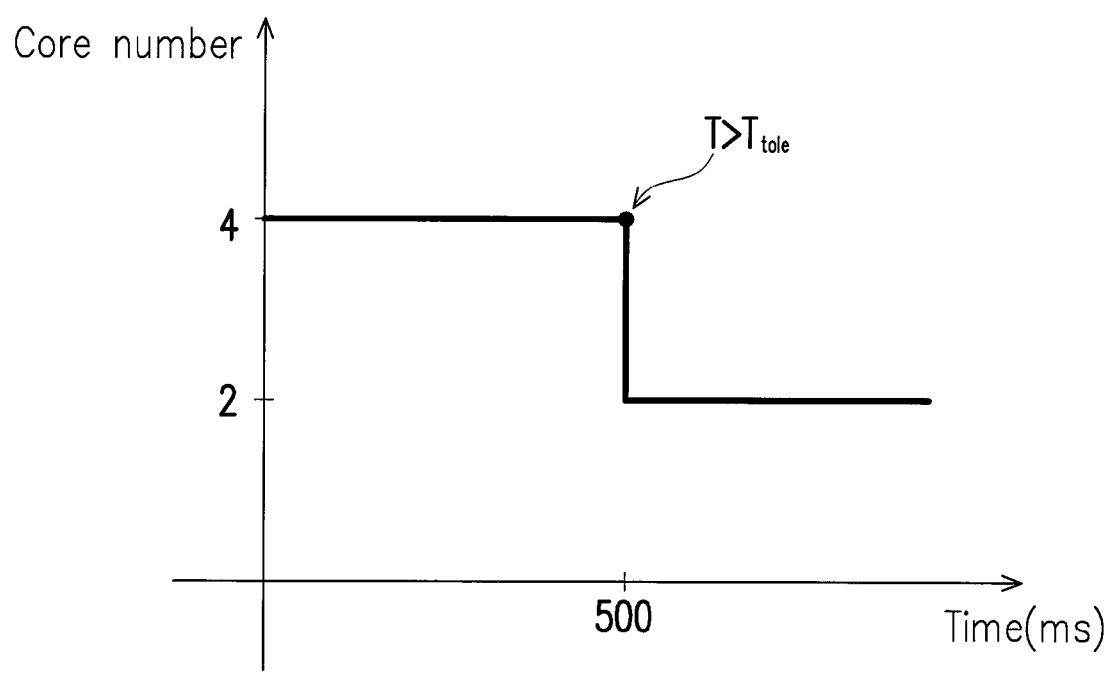
FIG. 1 is a diagram illustrating an enabled core number of a conventional electronic device with a multi-core processor.

Reference will now be made in detail to the present preferred embodiments of the invention, examples of which are illustrated in the accompanying drawings. Wherever possible, the same reference numbers are used in the drawings and the description to refer to the same or like parts.

Regarding an electronic device with a multi-core processor, to avoid the impact of the sudden drop in the number of running processor cores on the system performance of the electronic device, in the invention, the number of running processor cores is dynamically adjusted to reduce the power consumption and the temperature of the electronic device and, at the same time, maintain the system performance to avoid any discomfort on the user. Based on this concept, the invention provides an electronic device and a power management method thereof. Below, embodiments of the invention will be described as implementation examples of the invention.

Figure 2:
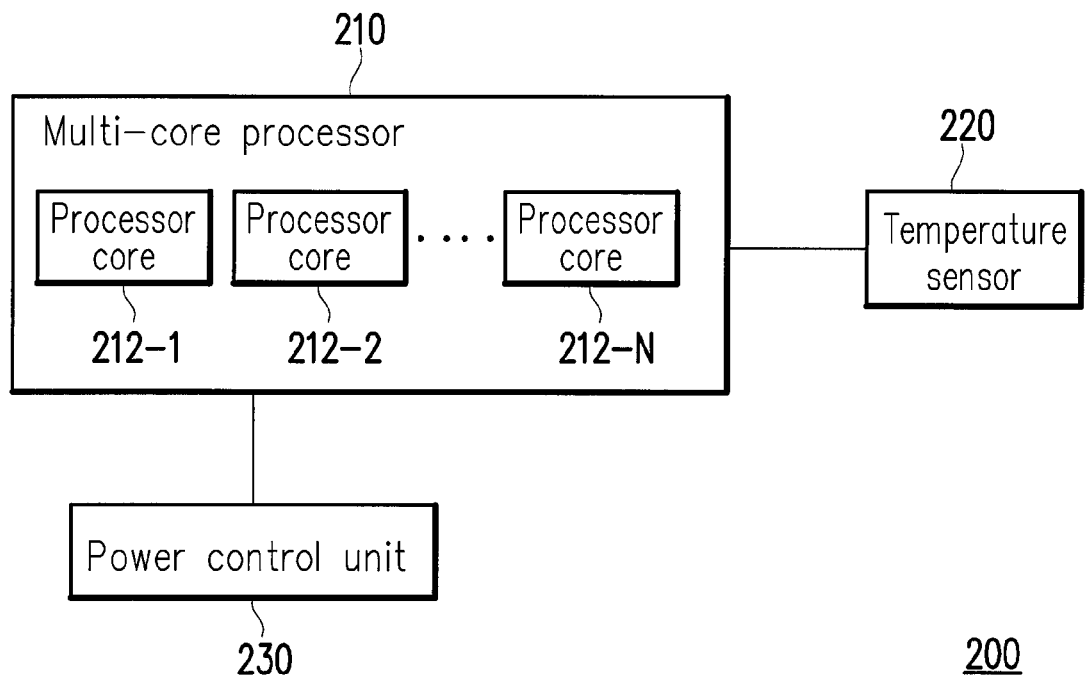
FIG. 2 is a block diagram of an electronic device according to an embodiment of the invention.

FIG. 2 is a block diagram of an electronic device according to an embodiment of the invention. Referring to FIG. 2, the electronic device 200 in the present embodiment may be a smart phone, a notebook computer, an ultrabook computer, or a tablet computer. However, the invention is not limited thereto. The electronic device 200 includes a multi-core processor 210, a temperature sensor 220, and a power control unit 230.

The multi-core processor 210 has a plurality of processor cores 212-1, 212-2, . . . , and 212-N. Herein N is a positive integer greater than 1. The processor cores 212-1, 212-2, . . . , and 212-N may offer the same or different operational functions, which is not limited herein.

The temperature sensor 220 is coupled to the multi-core processor 210. The temperature sensor 220 may be a single temperature sensor or a combination of multiple temperature sensors. In an embodiment, the temperature sensor 220 is disposed inside the multi-core processor 210 for detecting the core temperature of the multi-core processor 210. In another embodiment, the temperature sensor 220 is disposed outside the multi-core processor 210 for detecting the surface temperature of the multi-core processor 210. Regardless of whether the temperature sensor 220 is disposed inside or outside the multi-core processor 210, it should be disposed close to the heat source (the operating element that generates heat, such as the main chipset). The temperature sensor 220 may be a thermistor, a thermalcouple, or a thermaldiode. In an embodiment, the temperature sensor 220 is a digital thermal sensor (DTS) composed of a thermaldiode and an analog-to-digital converter (ADC). The temperature sensor 220 may be a single temperature sensor or a combination of multiple temperature sensors, which is not limited in the invention.

The power control unit 230 is coupled to the multi-core processor 210. The power control unit 230 is a functional module implemented with a firmware or a software. The power control unit 230 dynamically adjusts a switching frequency according to the system performance of the electronic device 200, and the multi-core processor 210 switches the number of enabled (activated) ones of the processor cores 212-1, 212-2, . . . , and 212-N according to the switching frequency set by the power control unit 230.

Figure 3:
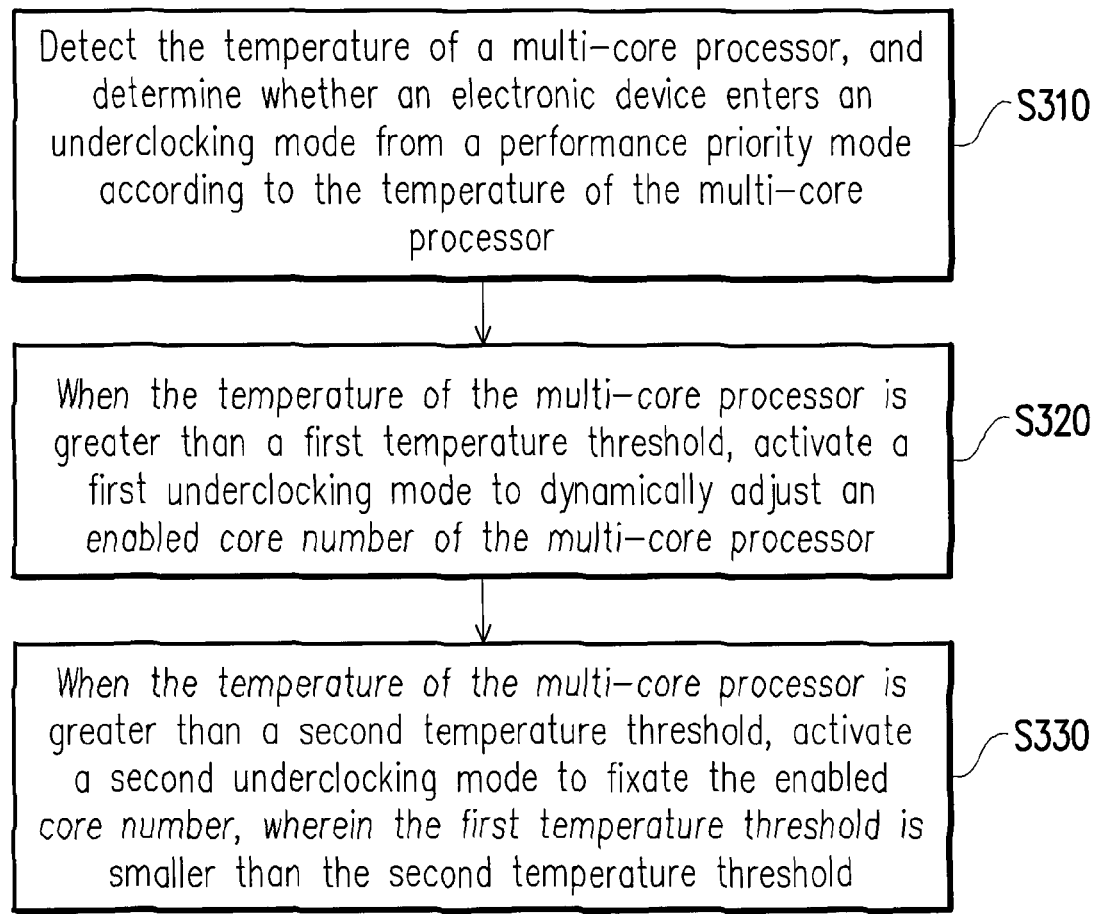
FIG. 3 is a flowchart of a power management method according to an embodiment of the invention.

FIG. 3 is a flowchart of a power management method according to an embodiment of the invention. Referring to FIG. 3, the power management method in the present embodiment is adapted to the electronic device 200 illustrated in FIG. 2. Below, the power management method in the present embodiment will be described in detail with reference to FIG. 2.

For the convenience of description, in the present embodiment, it is assumed that the multi-core processor 210 has four processor cores 212-1, 212-2, 212-3, and 212-4. In the first step S310, the temperature sensor 220 detects the temperature of the multi-core processor 210 and sends the detected temperature to the multi-core processor 210 to determine whether the electronic device 200 enters an underclocking mode from a performance priority mode accordingly. In the present embodiment, all the processor cores of the electronic device 200 are enabled (activated) in the performance priority mode. Namely, all the four processor cores 212-1, 212-2, 212-3, and 212-4 of the electronic device 200 run at their full speed to achieve the optimal execution efficiency.

When all the processor cores run at full speed, the power consumption is very high and the temperature increases quickly. When the temperature of the multi-core processor 210 exceeds the tolerable temperature limit, a thermal shutdown may happen or some elements may be damaged. Thus, when the temperature of the multi-core processor 210 is very high, according to the invention, the electronic device 200 is switched from the performance priority mode to the underclocking mode.

Figure 4:
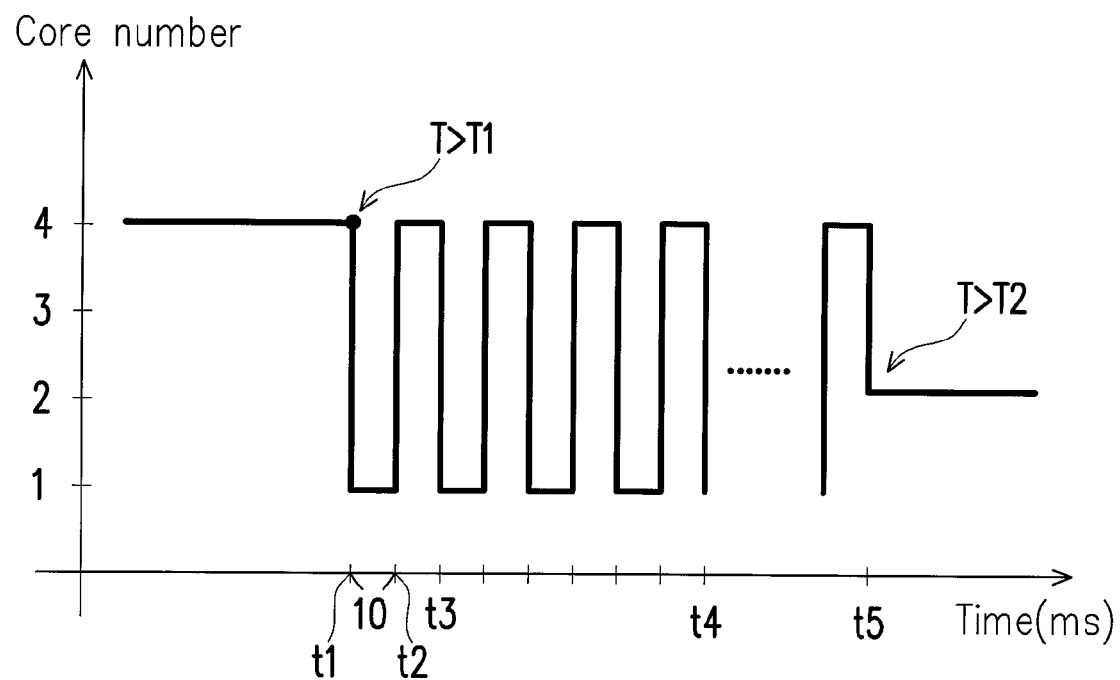
FIG. 4 is a diagram illustrating how an enabled core number of a multi-core processor is dynamically adjusted according to an embodiment of the invention.

In step S320, when the temperature of the multi-core processor 210 is greater than a temperature threshold, a first underclocking mode is activated to dynamically adjust an enabled core number of the multi-core processor 210. Herein the enabled core number is the number of enabled processor cores in the multi-core processor 210. FIG. 4 is a diagram illustrating how an enabled core number of a multi-core processor is dynamically adjusted according to an embodiment of the invention. Referring to FIG. 4, before the time point t1, the electronic device 200 is in the performance priority mode. Thus, all the four processor cores of the multi-core processor 210 are activated. However, at time point t1, because the temperature T of the multi-core processor 210 is greater than a first temperature threshold T1 (T>T1), the first underclocking mode is started. Namely, the multi-core processor 210 dynamically adjusts the enabled core number of the multi-core processor 210 to periodically switch the enabled core number between a first setting value and a second setting value. In the present embodiment, the first setting value is 4, the second setting value is 1, and the difference between the time point t1 and the time point t2 is 10 ms. Namely, between the time points t1 and t2, the multi-core processor 210 activates only one processor core, between the time points t2 and t3, the multi-core processor 210 activates all the four processor cores, and so on. The switching interval is 20 ms, and the switching frequency is (1/0.02) Hz.

It should be noted that during the same time period (for example, between the time points t1 and t4), the power consumption in FIG. 1 with two running processor cores and the power consumption in the present embodiment with one to four running processor cores are the same (i.e., a power saving purpose is achieved). On the other hand, in the invention, the system performance is maintained at that of four processor cores by quickly switching the enabled core number of the multi-core processor 210, so that the user won't notice any change in the performance of the electronic device 200. However, the technique illustrated in FIG. 1 can only maintain the performance of two processor cores. Thereby, the purposes of slowing down the temperature increase, reducing the power consumption, and maintaining the system performance are all accomplished in the invention.

In the present embodiment, if the temperature of the multi-core processor 210 in the electronic device 200 keeps increasing when the multi-core processor 210 runs for a prolonged time, a second underclocking mode is further activated. In step S330, when the temperature of the multi-core processor 210 is greater than a second temperature threshold, the electronic device 200 is controlled to enter the second underclocking mode. Herein the first temperature threshold is smaller than the second temperature threshold. Referring to FIG. 4 again, if the temperature T detected by the temperature sensor 220 at time point t5 is greater than that a second temperature threshold T2, the enabled core number is fixated to a third setting value. In the present embodiment, the third setting value is 2. Namely, after the time point t5, the electronic device 200 works with only two processor cores. Herein the third setting value is not limited and can be any value as long as it is smaller than the first setting value. Additionally, in the present embodiment, the first temperature threshold is 80° C., and the second temperature threshold is 90° C.

Generally, whether the display of an electronic device provides a smooth visual effect directly affects user's experience in using the electronic device. The system performance of an electronic device for running games or moves can be determined by its frame rate. The frame rate is measured in units of FPS (frame per second). Thus, in an embodiment of the invention, the frame rate variation is further taken into consideration to ensure that a comfortable experience can be brought to the user when an electronic device operates in the underclocking mode.

Figure 5:
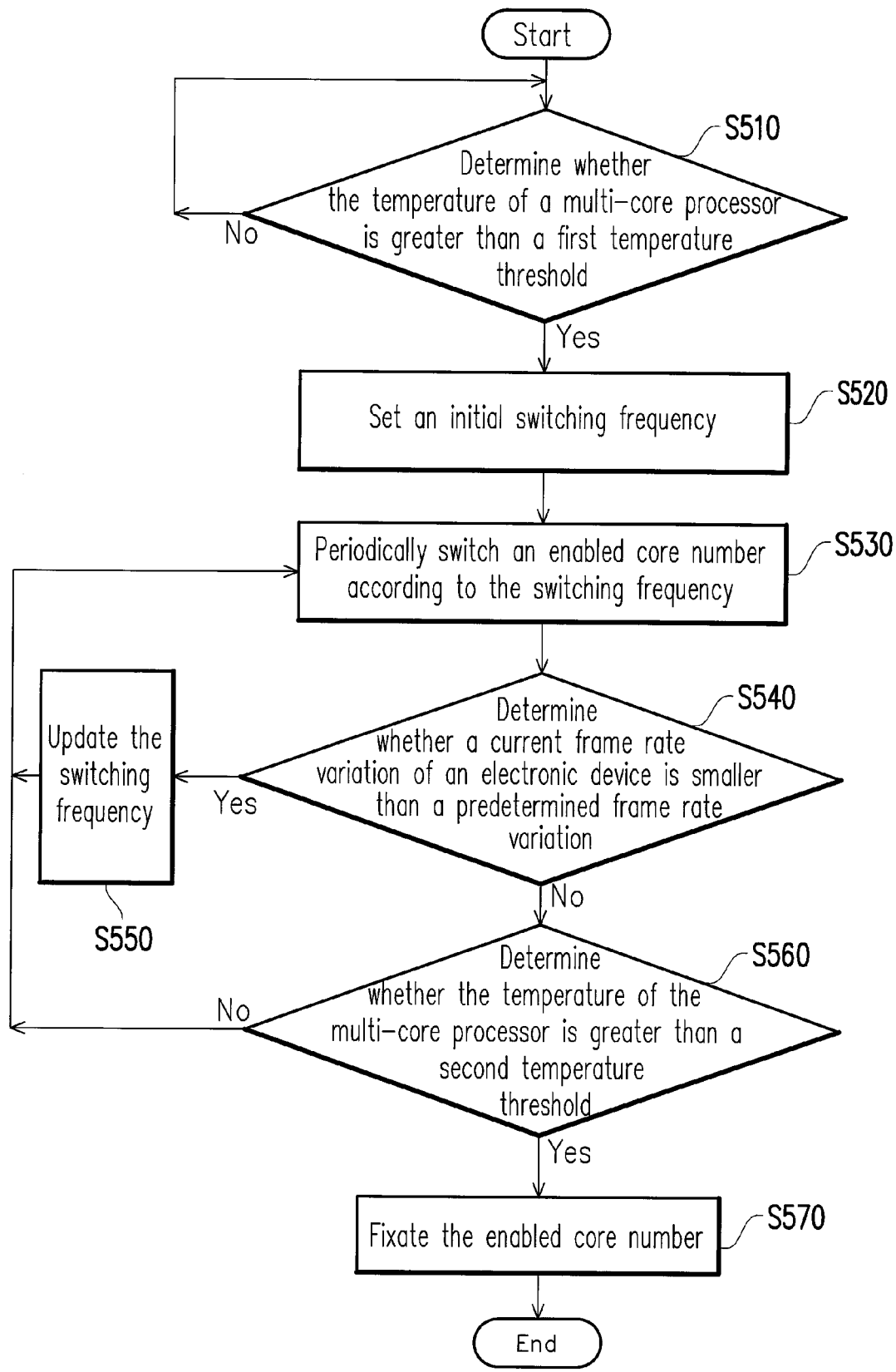
FIG. 5 is a flowchart of a power management method according to another embodiment of the invention.

FIG. 5 is a flowchart of a power management method according to another embodiment of the invention. The power management method will be described below with reference to both FIG. 2 and FIG. 5.

First, in the present embodiment, it is assumed that all the four processor cores 212-1, 212-2, 212-3, and 212-4 of the electronic device 200 run at their full speed and an execution efficiency of 60 FPS can be achieved.

In step S510, the temperature sensor 220 detects the temperature of the multi-core processor 210 and sends the detected temperature to the multi-core processor 210 to determine whether the temperature of the multi-core processor 210 is greater than the first temperature threshold. In the present embodiment, the first temperature threshold is 80° C., and which can be determined by the user according to the actual application conditions. If the temperature of the multi-core processor 210 is greater than the first temperature threshold, the electronic device 200 enters the underclocking mode from the performance priority mode and step S520 is executed.

Figure 6A:
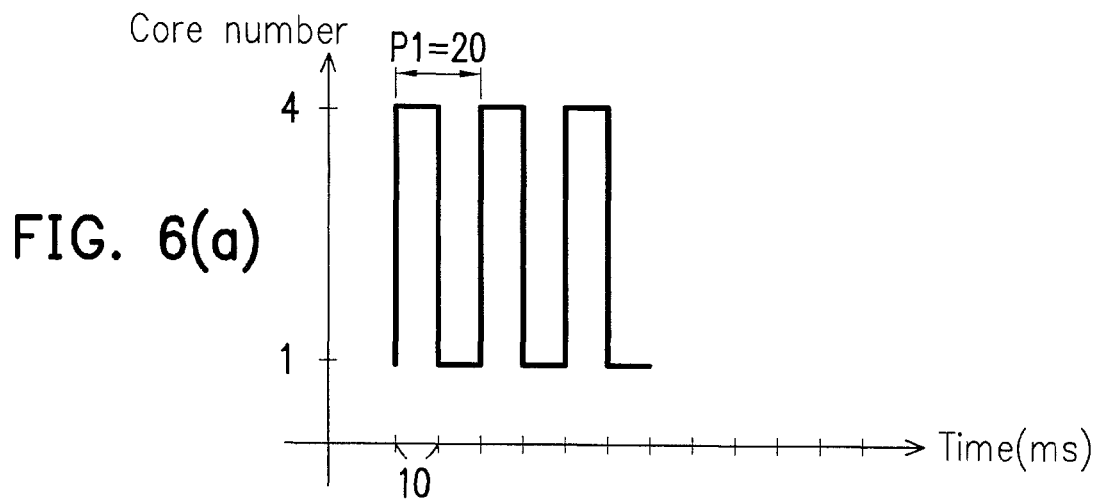
FIGS. 6(a)-6(c) are diagrams illustrating how a switching frequency is updated according to another embodiment of the invention.
Figure 6B:
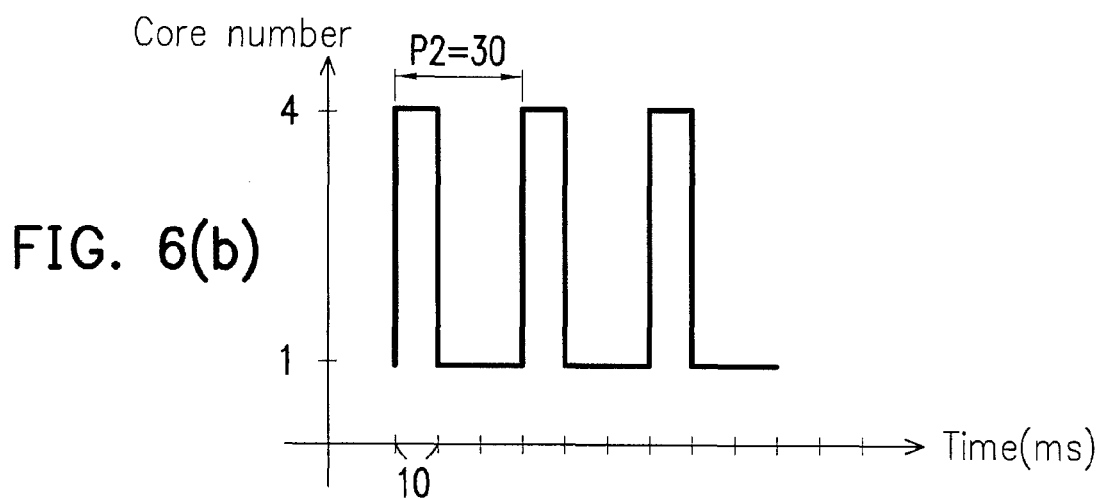
Figure 6C:
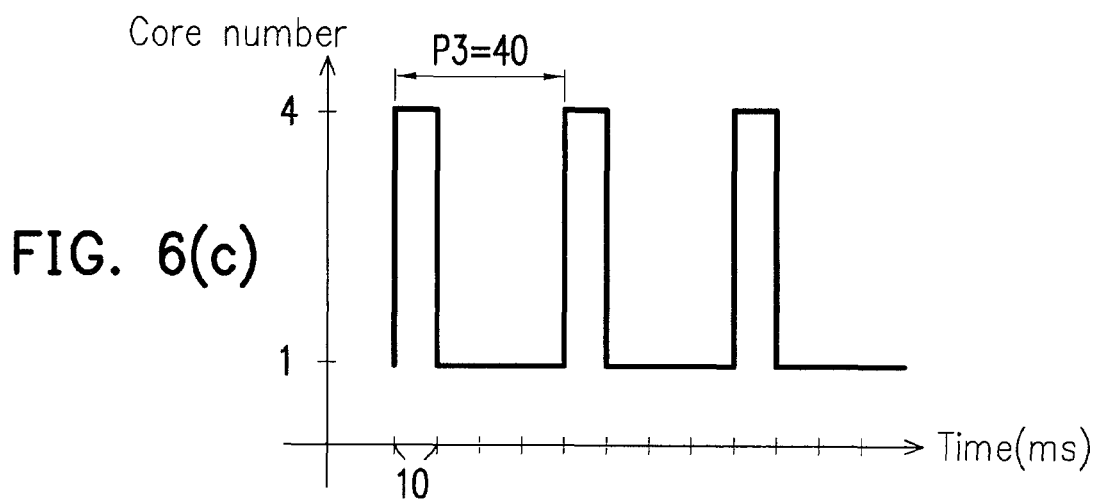

In step S520, the power control unit 230 sets the initial switching frequency. FIGS. 6(a)-6(c) are diagrams illustrating how a switching frequency is updated according to another embodiment of the invention. Referring to FIG. 6(a) first, the switching time period P1 is 20 ms, and the initial switching frequency is (1/0.02) Hz.

In step S530, the multi-core processor 210 periodically switches the enabled core number according to the current switching frequency. In the present embodiment, it is assumed that the multi-core processor 210 switches between four active processor cores and one active processor cores.

In next step S540, the power control unit 230 determines whether the current frame rate variation of the electronic device 200 is smaller than a predetermined frame rate variation. In the present embodiment, the predetermined frame rate variation is 5 FPS. Herein it is assumed that the user won't notice any change in the system performance when the frame rate variation does not exceed 5 FPS. In other words, a frame rate between 55 FPS and 60 FPS is a tolerable frame rate. The predetermined frame rate variation can be determined by the user according to the actual application, and the value thereof is not limited herein.

If the current frame rate variation when the multi-core processor 210 dynamically switches the enabled core number according to the initial switching frequency (1/0.02 Hz) is 2 FPS (i.e., the frame rate of the electronic device 200 is reduced to 58 FPS), the power control unit 230 determines that the current frame rate variation (i.e., 60 FPS−58 FPS=2 FPS) of the electronic device 200 is not greater than the predetermined frame rate variation (i.e., 5 FPS), and step S550 is executed next, in which the power control unit 230 continues to update the switching frequency.

Next, referring to FIG. 6(b), the switching time period P2 is increased to 30 ms, and the switching frequency is reduced to (1/0.03) Hz. The multi-core processor 210 periodically switches the enabled core number according to the updated switching frequency. However, it should be noted that the multi-core processor 210 controls the enabled core number at 1 for a prolonged time while at 4 for an unchanged time. If the frame rate when the multi-core processor 210 dynamically switches the enabled core number according to the switching frequency (1/0.03) Hz is reduced to 56 FPS, the power control unit 230 determines that the current frame rate variation (i.e., 60 FPS−56 FPS=4 FPS) of the electronic device 200 is not greater than the predetermined frame rate variation (i.e., 5 FPS), and step S550 is executed to update the switching frequency.

Referring to FIG. 6(c), the switching time period P3 is increased to 40 ms, and the switching frequency is reduced to (1/0.04) Hz. Similarly, the multi-core processor 210 periodically switches the enabled core number according to the updated switching frequency. If the frame rate when the multi-core processor 210 dynamically switches the enabled core number according to the switching frequency (1/0.04) Hz is reduced to 54 FPS, the power control unit 230 determines that the current frame rate variation (i.e., 60 FPS−54 FPS=6 FPS) of the electronic device 200 is greater than the predetermined frame rate variation (i.e., 5 FPS), and step S560 is executed next.

The temperature sensor 220 detects the temperature of the multi-core processor 210 and sends the detected temperature to the multi-core processor 210 to determine whether the temperature of the multi-core processor 210 is greater than a second temperature threshold. In the present embodiment, the second temperature threshold is 90° C. However, the invention is not limited thereto, and the second temperature threshold can be determined by the user according to the actual application.

If the temperature of the multi-core processor 210 is not greater than the second temperature threshold, step S530 is executed again, and the enabled core number is periodically switched based on the current switching frequency (1/0.04 Hz). If the temperature of the multi-core processor 210 is greater than the second temperature threshold (which means the temperature of the multi-core processor 210 increases too quickly), step S570 is executed to fixate the enabled core number, so that the enabled core number is not dynamically switched anymore. For example, the enabled core number is set to 1. Namely, when step S570 is executed, the electronic device 200 only activates one of the processor cores 212-1, 212-2, 212-3, and 212-4.

As described above, in the invention, the number of running processor cores is dynamically adjusted to reduce the power consumption of an electronic device and slow down the temperature increase thereof. While at the same time, the system performance is maintained to provide a comfortable visual experience to the user even when the electronic device is in an underclocking mode. Moreover, a predetermined frame rate variation is set to control the frequency of the dynamic switching operation, so as to ensure a smooth visual effect on the display of the electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device with a power management mechanism, comprising:
   a multi-core processor, having a plurality of processor cores;
   a temperature sensor, coupled to the multi-core processor, wherein the temperature sensor detects a temperature of the multi-core processor,
   wherein when the temperature of the multi-core processor is greater than a first temperature threshold, the multi-core processor activates a first underclocking mode to dynamically adjust an enabled core number, wherein the enabled core number is a number of enabled processor cores among the processor cores,
   wherein when the temperature of the multi-core processor is greater than a second temperature threshold, the multi-core processor activates a second underclocking mode to fixate the enabled core number, wherein the first temperature threshold is smaller than the second temperature threshold; and
   a power control unit, coupled to the multi-core processor, wherein the power control unit sets a switching frequency,
   wherein the power control unit determines whether a current frame rate variation is smaller than a predetermined frame rate variation, wherein when the current frame rate variation is smaller than the predetermined frame rate variation, the power control unit updates the switching frequency, and the multi-core processor switches the enabled core number according to the updated switching frequency, and
   wherein the power control unit repeats determining whether the current frame rate variation is smaller than the predetermined frame rate variation and repeats updating the switching frequency until the current frame rate variation is greater than or equal to the predetermined frame rate variation.

2. The electronic device according to claim 1, wherein the multi-core processor periodically switches the enabled core number between a first setting value and a second setting value according to the switching frequency, wherein the second setting value is smaller than the first setting value.

3. The electronic device according to claim 1, wherein the power control unit reduces the switching frequency, and the multi-core processor controls the enabled core number to remain at the second setting value for a prolonged time period while at the first setting value for an unchanged time period according to the switching frequency.

4. The electronic device according to claim 1, wherein after the electronic device enters the second underclocking mode:
   the multi-core processor fixates the enabled core number to a third setting value, wherein the third setting value is smaller than the first setting value.

5. The electronic device according to claim 1, wherein the electronic device is a smart phone, a notebook computer, an ultrabook computer, or a tablet computer.

6. The electronic device according to claim 1, wherein the temperature sensor is one or a combination of a thermistor, a thermalcouple, and a thermaldiode.

7. A power management method, adapted to an electronic device with a multi-core processor, the power management method comprising:
   detecting a temperature of the multi-core processor;
   when the temperature of the multi-core processor is greater than a first temperature threshold, activating a first underclocking mode to dynamically adjust an enabled core number of the multi-core processor, wherein the enabled core number is a number of a plurality of enabled processor cores in the multi-core processor; and
   when the temperature of the multi-core processor is greater than a second temperature threshold, activating a second underclocking mode to fixate the enabled core number, wherein the first temperature threshold is smaller than the second temperature threshold, wherein the step of activating the first underclocking mode to dynamically adjust the enabled core number of the multi-core processor comprises:
(a) setting a switching frequency;
(b) determining whether a current frame rate variation of the electronic device is smaller than a predetermined frame rate variation;
(c) when the current frame rate variation is smaller than the predetermined frame rate variation, updating the switching frequency and switching the enabled core number according to the updated switching frequency by using the multi-core processor; and
(d) repeating steps (b) and (c) until the current frame rate variation is greater than or equal to the predetermined frame rate variation.

8. The power management method according to claim 7, wherein the step of activating the first underclocking mode to dynamically adjusting the enabled core number of the multi-core processor further comprises:
periodically switching the enabled core number between a first setting value and a second setting value according to the switching frequency, wherein the second setting value is smaller than the first setting value.

9. The power management method according to claim 7, wherein the step (c) comprises:
reducing the switching frequency, and controlling the enabled core number to remain at the second setting value for a prolonged time period while at the first setting value for an unchanged time period.

10. The power management method according to claim 7, wherein the step of activating the second underclocking mode comprises:
fixating the enabled core number to a third setting value, wherein the third setting value is smaller than the first setting value.

* * * * *